(12) United States Patent
Ma et al.

(10) Patent No.: US 9,169,141 B2
(45) Date of Patent: Oct. 27, 2015

(54) WATER TREATMENT METHOD BY CATALYZING OZONE WITH A PERSULFATE

(75) Inventors: Jun Ma, Harbin (CN); Jin Jiang, Harbin (CN); Suyan Pang, Harbin (CN); Yi Yang, Harbin (CN); Juntao Zhu, Harbin (CN)

(73) Assignee: HARBIN INSTITUTE OF TECHNOLOGY, Harbin, Heilongjiang Province (CN)

( * ) Notice: Subject to any disclaimer, the term of this patent is extended or adjusted under 35 U.S.C. 154(b) by 77 days.

(21) Appl. No.: 14/118,660

(22) PCT Filed: May 15, 2012

(86) PCT No.: PCT/CN2012/075484
§ 371 (c)(1),
(2), (4) Date: Nov. 19, 2013

(87) PCT Pub. No.: WO2012/155823
PCT Pub. Date: Nov. 22, 2012

(65) Prior Publication Data
US 2014/0091046 A1    Apr. 3, 2014

(30) Foreign Application Priority Data

May 19, 2011    (CN) .......................... 2011 1 0130926

(51) Int. Cl.
*C02F 1/72*    (2006.01)
*C02F 1/78*    (2006.01)

(52) U.S. Cl.
CPC .................. *C02F 1/722* (2013.01); *C02F 1/725* (2013.01); *C02F 1/78* (2013.01)

(58) Field of Classification Search
CPC ............ C02F 1/722; C02F 1/725; C02F 1/78; C02F 2103/005; C02F 2305/02; C02F 2305/023
See application file for complete search history.

(56) References Cited

U.S. PATENT DOCUMENTS 7,667,087 B2 *    2/2010  Ball .............................. 588/320

* cited by examiner

*Primary Examiner* — Lucas Stelling
(74) *Attorney, Agent, or Firm* — Novoclaims Patent Services LLC; Mei Lin Wong

(57) ABSTRACT

A water treatment method by catalyzing ozone with a persulfate comprises the following steps: introducing the ozone into an ozone contact reactor filled with water to be treated; at the same time putting the persulfate into the reactor, wherein a stirring state is kept in the water treatment process. The method solves the problems of difficulty in the ionization of hydrogen peroxide, low capability in inducing the decomposition of the ozone, high hydrogen peroxide residues and inconvenience of hydrogen peroxide transportation and storage existing in the conventional water treatment method for catalyzing the ozone by using the hydrogen peroxide. Hydroxyl radicals and sulfate free radicals with strong oxidizing properties, which are generated by catalyzing ozone with the persulfate, are oxidized to remove pollution, so that the method has the advantages of high catalytic capability, high oxidative degradation efficiency, wide pH application range, a small amount of catalyst residues, convenience of operation and the like, and can be applied in mass production.

18 Claims, 1 Drawing Sheet

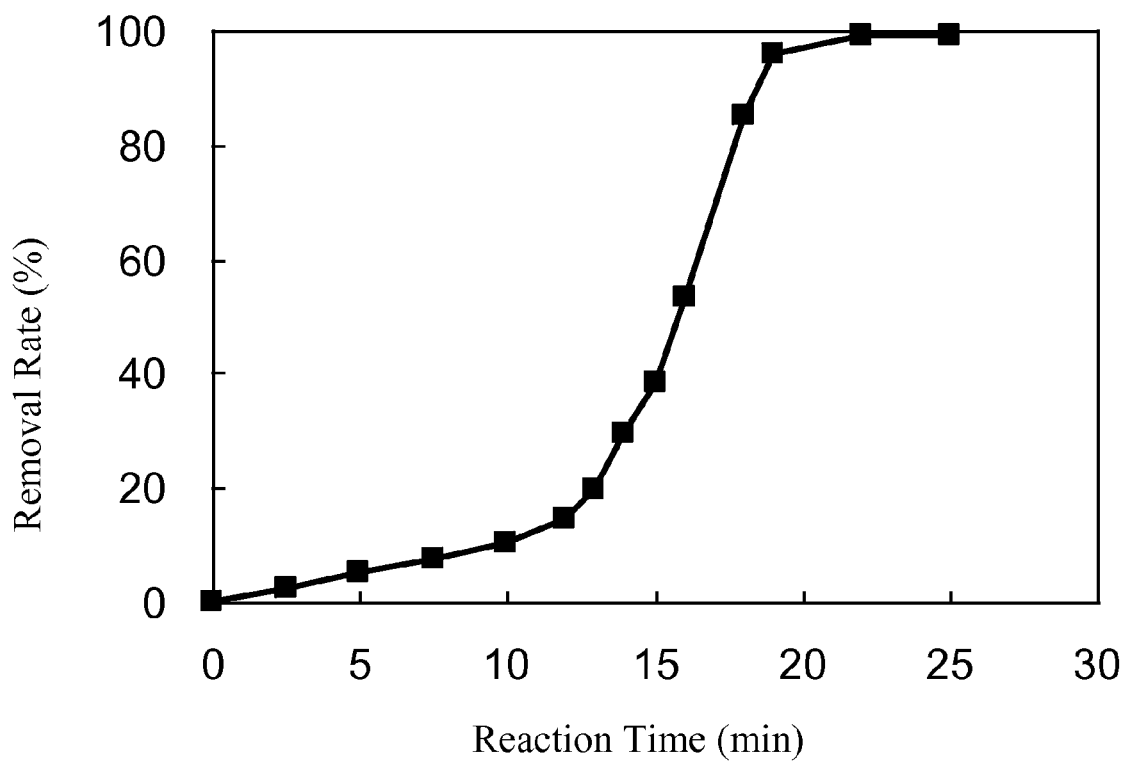

WATER TREATMENT METHOD BY CATALYZING OZONE WITH A PERSULFATE

CROSS REFERENCE OF RELATED APPLICATION

This is a national phase national application of an international patent application number PCT/CN2012/075484 with a filing date of May 15, 2012, which claimed priority of a foreign application number 201110130926.9 with a filing date of May 19, 2011 in China. The contents of these specifications, including any intervening amendments thereto, are incorporated herein by reference.

BACKGROUND OF THE PRESENT INVENTION

1. Field of Invention

The present invention relates to a water treatment method which utilizes ozone for the water treatment process.

2. Description of Related Arts

Ozone is a strong oxidizing agent and is widely used in drinking water and sewage processing. However, ozone is quite selective on oxidation and degradation of organic substances. Catalytic ozone oxidation technology is an advanced oxidation processing technology in recent development in which ozone is used to produced highly oxidative hydroxyl radicals (.OH) under catalytic reaction. Compared to ozone-only mechanism, the hydroxyl radicals produced under catalytic reaction can oxidize organic substances non-selectively and the reaction is rapid and efficient. Accordingly, catalytic ozone oxidation technology becomes the hotspot of research and development at international level. Hydrogen peroxide ($H_2O_2$) catalyzes ozone mainly by the $HO_2^-$ released from ionization of hydrogen peroxide in aqueous solution to induce the decomposition of ozone to produce the hydroxyl radicals. However, the treatment process which utilizes catalytic ozone oxidation with hydrogen peroxide has the following drawbacks in practice: (1) ionization of hydrogen peroxide is not easy by itself and therefore the ability to induce the decomposition of ozone is weak; (2) the residual hydrogen peroxide will require a large additional amount of chlorine in the subsequent disinfection process; (3) the hydrogen peroxide itself will reduce the number of free radicals (.OH+ $H_2O_2 \rightarrow H^+ + O_2^-$.), therefore in practice, a multi-points addition method is employed for the treatment process, which is very inconvenience to operation and management; (4) hydrogen peroxide in aqueous solution is highly unstable and easily decomposed, which is very inconvenience for storage and transportation.

SUMMARY OF THE PRESENT INVENTION

An object of the present invention is to provide a water treatment method by catalyzing ozone with a persulfate in order to solve the existing problems of water treatment by catalytic ozone oxidation with hydrogen peroxide. The existing problems includes difficulties in ionization of hydrogen peroxide and therefore the weak ability to induce ozone decomposition, existence of hydrogen peroxide residues and inconvenience in storage and transportation.

SOLUTION TO THE PROBLEMS

Technical Solutions

According to a preferred embodiment of the present invention, a water treatment process by catalyzing ozone oxidation with a persulfate comprises the steps of: introducing ozone into an ozone contact reactor in which the ozone contact reactor is filled with water subject to treatment and adding persulfate into the ozone contact reactor simultaneously, wherein an initial concentration of ozone is 0.1~40 mg/L and a molar ratio of persulfate to ozone is 1:0.1~10, then the water treatment process is complete, wherein a hydraulic retention time of the water subject to treatment in the ozone contact reactor is controlled at 5~60 min, and the water subject to treatment is kept at a stirring condition during the water treatment process, wherein the water subject to treatment is selected from the group consisting of polluted water, secondary effluent from wastewater treatment plant, source water and filtered water.

According to a preferred embodiment of the present invention, the step of adding persulfate is adding persulfate in solid form directly or adding persulfate in solution form.

According to a preferred embodiment of the present invention, the persulfate is peroxomonosulfate and/or peroxodisulfate, wherein the peroxomonosulfate is selected from one or more of the group consisting of potassium peroxymonosulfate, sodium peroxymonosulfate and ammonium peroxymonosulfate, wherein the peroxodisulfate is selected from one or more of the group consisting of potassium peroxydisulfate, sodium peroxydisulfate and ammonium peroxydisulfate.

According to a preferred embodiment of the present invention, the persulfate is replaced by a persulfate-alkali complex salt, wherein a molar ratio of persulfate to alkali of the persulfate-alkali complex salt is 1:1~10, and the addition of alkali can adjust the pH of the water treatment system to 6~9, wherein the persulfate of the persulfate-alkali complex salt is peroxomonosulfate and/or peroxodisulfate, the alkali of the persulfate-alkali complex salt is selected from one or more of the group consisting of potassium hydroxide, sodium hydroxide, calcium hydroxide, sodium carbonate, potassium carbonate, sodium bicarbonate and potassium bicarbonate, wherein the peroxomonosulfate of the persulfate-alkali complex salt is selected from one or more of the group consisting of potassium peroxymonosulfate, sodium peroxymonosulfate and ammonium peroxymonosulfate, wherein the peroxodisulfate of the persulfate-alkali complex salt is selected from one or more of the group consisting of potassium peroxydisulfate, sodium peroxydisulfate and ammonium peroxydisulfate.

Advantageous Effect of the Present Invention

According to the water treatment process which utilizes persulfate in catalytic ozone oxidation of the present invention, the persulfate is a new type of environmental friendly catalyst which has the following advantageous features: (1) the persulfate itself is easy to ionize, therefore having a strong effect on inducing ozone decomposition; (2) the residual amount of persulfate in the catalytic ozone oxidation process is small and does not require additional amount of chlorine in the subsequent treatment process while the persulfate itself can provide disinfection effect; (3) the persulfate has very weak effect on reducing the number of free radicals; and (4) the persulfate is in powder form which is easy for storage and transportation.

According to the water treatment process by catalyzing ozone with a persulfate of the present invention, the persulfate is utilized to catalyze ozone oxidation reaction through which strong oxidizing agents of hydroxyl radicals and sulfate radicals are produced for oxidation reaction and pollutant removal. Compared to hydrogen peroxide in catalytic ozone oxidation, the persulfate is advantageous in that the persulfate has a much stronger catalytic effect and higher efficiency on ozone decomposition, and a wide range of pH applicability. Also, the amount of catalyst residues is small and its operation is convenience. Accordingly, the persulfate can be applied in large scale production.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 1 is a graph showing the removal rate of pesticide atrazine in source water according to embodiment 29 of the present invention.

DETAILED DESCRIPTION OF THE PREFERRED EMBODIMENT

The preferred embodiment of the present invention is further described and includes all combinations and modifications encompassed within the spirit and scope of the followings.

Embodiment 1: According to this preferred embodiment of the present invention, the water treatment process by catalyzing ozone with a persulfate comprises the steps of: introducing ozone into an ozone contact reactor in which the ozone contact reactor is filled with water subject to treatment and adding persulfate into the ozone contact reactor simultaneously, wherein an initial concentration of ozone is 0.1~40 mg/L and a molar ratio of persulfate to ozone is 1:0.1~10, then the water treatment process is complete, wherein a hydraulic retention time of the water subject to treatment in the ozone contact reactor is controlled at 5~60 min, and the water subject to treatment is kept at a stirring condition during the water treatment process, wherein the water subject to treatment is selected from the group consisting of polluted water, secondary effluent from wastewater treatment plant, source water and filtered water.

According to this preferred embodiment of the present invention, the step of adding persulfate is adding persulfate in solid form directly or adding persulfate in solution form.

According to this preferred embodiment of the present invention, the water treatment process by catalyzing ozone with a persulfate, the persulfate is utilized to catalyze ozone oxidation reaction through which strong oxidizing agents of hydroxyl radicals and sulfate radicals are produced for oxidation reaction and pollutant removal. Compared to the treatment process which utilizes hydrogen peroxide in catalytic ozone oxidation, the use of persulfate is advantageous in that the persulfate has a much stronger catalytic effect and higher efficiency on ozone decomposition, a wider range of pH applicability, and a much smaller amount of catalyst residues and more convenience in operation. Therefore, the use of persulfate in the catalytic ozone oxidation for water treatment is applicable in large scale production.

Embodiment 2: The difference between this embodiment and the embodiment 1 is that the persulfate is peroxomonosulfate and/or peroxodisulfate. Other steps and parameters are the same as that of the embodiment 1.

According to this embodiment, if the persulfate is a mixture of peroxomonosulfate and peroxodisulfate, the peroxomonosulfate and peroxodisulfate can be mixed in any ratio. The peroxomonosulfate is selected from one or more of the group consisting of potassium peroxymonosulfate, sodium peroxymonosulfate and ammonium peroxymonosulfate. The peroxodisulfate is selected from one or more of the group consisting of potassium peroxydisulfate, sodium peroxydisulfate and ammonium peroxydisulfate.

Embodiment 3: The difference between this embodiment and the embodiment 1 is that the persulfate is peroxomonosulfate, wherein the peroxomonosulfate is selected from one or more of the group consisting of potassium peroxymonosulfate, sodium peroxymonosulfate and ammonium peroxymonosulfate. Other steps and parameters are the same as that of the embodiment 1.

According to this embodiment, if the peroxomonosulfate is a mixture of compositions of potassium peroxymonosulfate, sodium peroxymonosulfate and/or ammonium peroxymonosulfate, the different compositions can be mixed in any ratio.

Embodiment 4: The difference between this embodiment and the embodiment 1 is that the persulfate is peroxodisulfate, wherein the peroxodisulfate is selected from one or more of the group consisting of potassium peroxydisulfate, sodium peroxydisulfate and ammonium peroxydisulfate. Other steps and parameters are the same as that of the embodiment 1.

According to this embodiment, if the peroxodisulfate is a mixture of compositions of potassium peroxydisulfate, sodium peroxydisulfate and/or ammonium peroxydisulfate, the different compositions can be mixed in any ratio.

Embodiment 5: The difference between this embodiment and the embodiment 1 is that the persulfate is a mixture of peroxomonosulfate and peroxodisulfate, wherein the peroxomonosulfate is selected from one or more of the group consisting of potassium peroxymonosulfate, sodium peroxymonosulfate and ammonium peroxymonosulfate, wherein the peroxodisulfate is selected from one or more of the group consisting of potassium peroxydisulfate, sodium peroxydisulfate and ammonium peroxydisulfate. Other steps and parameters are the same as that of the embodiment 1.

According to this embodiment, the peroxomonosulfate and the peroxodisulfate can be mixed in any ratio. If the peroxomonosulfate is a mixture of compositions of potassium peroxymonosulfate, sodium peroxymonosulfate and/or ammonium peroxymonosulfate, the different compositions can be mixed in any ratio. If the peroxodisulfate is a mixture of compositions of potassium peroxydisulfate, sodium peroxydisulfate and/or ammonium peroxydisulfate, the different compositions can be mixed in any ratio.

Embodiment 6: The difference between this embodiment and the embodiment 1 is that the persulfate is replaced by a persulfate-alkali complex salt, wherein a molar ratio of persulfate to alkali of the persulfate-alkali complex salt is 1:1~10, wherein the persulfate of the persulfate-alkali complex salt is peroxomonosulfate and/or peroxodisulfate, and the alkali of the persulfate-alkali complex salt contains one or more alkali compositions selected from the group consisting of potassium hydroxide, sodium hydroxide, calcium hydroxide, sodium carbonate, potassium carbonate, sodium bicarbonate and potassium bicarbonate. Other steps and parameters are the same as that of the embodiment 1.

According to this embodiment, if the persulfate of the persulfate-alkali complex salt is a mixture of peroxomonosulfate and peroxodisulfate, the peroxomonosulfate and peroxodisulfate can be mixed in any ratio. If the alkali of the persulfate-alkali complex salt is a mixture of one or more alkali compositions, the alkali compositions can be mixed in any ratio.

According to this embodiment, the addition of alkali can adjust the pH of the water treatment system to 6~9, hence promoting ionization of persulfate and increasing the inducing effect on ozone decomposition.

According to this embodiment, the molar ratio of persulfate to alkali of the persulfate-alkali complex salt is preferably 1:3~8, and the optimal is 1:5.

Embodiment 7: The difference between this embodiment and the embodiment 6 is that the persulfate of the persulfate-alkali complex is peroxomonosulfate, wherein a molar ratio of peroxomonosulfate to alkali of the persulfate-alkali complex salt is 1:1~10, wherein the peroxomonosulfate includes one or more peroxomonosulfate compositions selected from the group consisting of potassium peroxymonosulfate, sodium peroxymonosulfate and ammonium peroxymonosulfate. Other steps and parameters are the same as that of the embodiment 6.

According to this embodiment, if the peroxomonosulfate is a mixture of peroxomonosulfate compositions, the different peroxomonosulfate compositions can be mixed in any ratio.

According to this embodiment, the molar ratio of peroxomonosulfate to alkali is preferably 1:3~8, and the optimal is 1:5.

Embodiment 8: The difference between this embodiment and the embodiment 6 is that the persulfate of the persulfate-alkali complex is peroxodisulfate, wherein a molar ratio of peroxodisulfate to alkali of the persulfate-alkali complex salt is 1:1~10, wherein the peroxodisulfate includes one or more peroxodisulfate compositions selected from the group consisting of potassium peroxydisulfate, sodium peroxydisulfate and ammonium peroxydisulfate. Other steps and parameters are the same as that of the embodiment 6.

According to this embodiment, if the peroxodisulfate is a mixture of peroxodisulfate compositions, the different peroxodisulfate compositions can be mixed in any ratio.

According to this embodiment, the molar ratio of peroxodisulfate to alkali is preferably 1:3~8, and the optimal is 1:5.

Embodiment 9: The difference between this embodiment and the embodiment 6 is that the persulfate of the persulfate-alkali complex includes peroxomonosulfate and peroxodisulfate, wherein a molar ratio of the persulfate (which is the total content of peroxomonosulfate and peroxodisulfate) to alkali of the persulfate-alkali complex salt is 1:1~10, wherein the peroxomonosulfate includes one or more peroxomonosulfate compositions selected from the group consisting of potassium peroxymonosulfate, sodium peroxymonosulfate and ammonium peroxymonosulfate, wherein the peroxodisulfate includes one or more peroxodisulfate compositions selected from the group consisting of potassium peroxydisulfate, sodium peroxydisulfate and ammonium peroxydisulfate.

According to this embodiment, if the peroxomonosulfate is a mixture of peroxomonosulfate compositions, the different peroxomonosulfate compositions can be mixed in any ratio. If the peroxodisulfate is a mixture of peroxodisulfate compositions, the different peroxodisulfate compositions can be mixed in any ratio.

According to this embodiment, the molar ratio of the persulfate (which is the total content of peroxomonosulfate and peroxodisulfate) to alkali of the persulfate-alkali complex salt is preferably 1:3~8, and the optimal is 1:5.

Embodiment 10: The difference between this embodiment and the embodiments 1~9 is that the initial concentration of ozone is 0.5~30 mg/L. Other steps and parameters are the same as that of one of the embodiments 1-9.

Embodiment 11: The difference between this embodiment and the embodiments 1-9 is that the initial concentration of ozone is 1~20 mg/L. Other steps and parameters are the same as that of one of the embodiments 1-9.

Embodiment 12: The difference between this embodiment and the embodiments 1-9 is that the initial concentration of ozone is 1.5~15 mg/L. Other steps and parameters are the same as that of one of the embodiments 1-9.

Embodiment 13: The difference between this embodiment and the embodiments 1-9 is that the initial concentration of ozone is 2~10 mg/L. Other steps and parameters are the same as that of one of the embodiments 1-9.

Embodiment 14: The difference between this embodiment and the embodiments 1-9 is that the initial concentration of ozone is 5 mg/L. Other steps and parameters are the same as that of one of the embodiments 1-9.

Embodiment 15: The difference between this embodiment and the embodiments 1-14 is that the molar ratio of persulfate to ozone is 1:0.2~9. Other steps and parameters are the same as that of one of the embodiments 1-14.

Embodiment 16: The difference between this embodiment and the embodiments 1-14 is that the molar ratio of persulfate to ozone is 1:0.3~8. Other steps and parameters are the same as that of one of the embodiments 1-14.

Embodiment 17: The difference between this embodiment and the embodiments 1-14 is that the molar ratio of persulfate to ozone is 1:0.4~7. Other steps and parameters are the same as that of one of the embodiments 1-14.

Embodiment 18: The difference between this embodiment and the embodiments 1-14 is that the molar ratio of persulfate to ozone is 1:0.5~6. Other steps and parameters are the same as that of one of the embodiments 1-14.

Embodiment 19: The difference between this embodiment and the embodiments 1-14 is that the molar ratio of persulfate to ozone is 1:0.6~5. Other steps and parameters are the same as that of one of the embodiments 1-14.

Embodiment 20: The difference between this embodiment and the embodiments 1-14 is that the molar ratio of persulfate to ozone is 1:0.7~4. Other steps and parameters are the same as that of one of the embodiments 1-14.

Embodiment 21: The difference between this embodiment and the embodiments 1-14 is that the molar ratio of persulfate to ozone is 1:0.8~3. Other steps and parameters are the same as that of one of the embodiments 1-14.

Embodiment 22: The difference between this embodiment and the embodiments 1-14 is that the molar ratio of persulfate to ozone is 1:0.9~2. Other steps and parameters are the same as that of one of the embodiments 1-14.

Embodiment 23: The difference between this embodiment and the embodiments 1-14 is that the molar ratio of persulfate to ozone is 1:1. Other steps and parameters are the same as that of one of the embodiments 1-14.

Embodiment 24: The difference between this embodiment and the embodiments 1-23 is that the hydraulic retention time of the water subject to treatment in the ozone contact reactor is controlled at 10~50 min. Other steps and parameters are the same as that of one of the embodiments 1-23.

Embodiment 25: The difference between this embodiment and the embodiments 1-23 is that the hydraulic retention time of the water subject to treatment in the ozone contact reactor is controlled at 20~40 min. Other steps and parameters are the same as that of one of the embodiments 1-23.

Embodiment 26: The difference between this embodiment and the embodiments 1-23 is that the hydraulic retention time of the water subject to treatment in the ozone contact reactor is controlled at 30 min. Other steps and parameters are the same as that of one of the embodiments 1-23.

Embodiment 27: According to this preferred embodiment of the present invention, the water treatment process by catalyzing ozone with a persulfate comprises the steps of: introducing ozone into an ozone contact reactor in which the ozone contact reactor is filled with polluted water subject to treatment and adding a persulfate-alkali complex into the ozone contact reactor simultaneously, where the persulfate-alkali complex is a peroxomonosulfate-potassium hydroxide complex, wherein an initial concentration of ozone is 30 mg/L, a molar ratio of peroxomonosulfate to ozone is 1:1 and a molar ratio of peroxomonosulfate to potassium hydroxide is 1:8, then the water treatment process is complete, wherein a hydraulic retention time of the polluted water in the ozone contact reactor is controlled at 60 min, and the polluted water is kept at a stirring condition during the water treatment process.

According to this preferred embodiment of the present invention, the step of adding persulfate is adding persulfate in solution form. The peroxomonosulfate is potassium peroxymonosulfate, sodium peroxymonosulfate or a mixture of potassium peroxymonosulfate and sodium peroxymonosulfate.

According to this preferred embodiment, the addition of potassium hydroxide can adjust the pH of the water treatment system to 6~9 such that an advanced treatment effect of the polluted water subject to treatment is achieved.

Preferably, the peroxomonosulfate is selected from one or more of the group consisting of potassium peroxymonosulfate, sodium peroxymonosulfate and ammonium peroxymonosulfate.

According to the water treatment process by catalyzing ozone with a persulfate of this preferred embodiment of the present invention, after the oxidation process, the removal rate of pollutants in the polluted water subject to treatment is above 90%.

Embodiment 28: According to this preferred embodiment of the present invention, the water treatment process by catalyzing ozone with a persulfate comprises the steps of: introducing ozone into an ozone contact reactor in which the ozone contact reactor is filled with water subject to treatment, which is secondary effluent from wastewater treatment plant, and adding a persulfate, which is a peroxodisulfate, into the ozone contact reactor simultaneously, wherein an initial concentration of ozone is 10 mg/L, and a molar ratio of persulfate to ozone is 1:1, then the water treatment process is complete, wherein a hydraulic retention time of the water subject to treatment in the ozone contact reactor is controlled at 60 min, and the water subject to treatment is kept at a stirring condition during the water treatment process.

According to this preferred embodiment of the present invention, the step of adding persulfate is adding persulfate in solution form.

According to this preferred embodiment of the present invention, the peroxodisulfate is selected from one or more of the group consisting of potassium peroxydisulfate, sodium peroxydisulfate and ammonium peroxydisulfate at any mixing ratio.

Embodiment 29: According to this preferred embodiment of the present invention, the water treatment process by catalyzing ozone with a persulfate comprises the steps of: introducing ozone into an ozone contact reactor in which the ozone contact reactor is filled with water subject to treatment, which is source water, and adding a persulfate, which is a potassium peroxymonosulfate, into the ozone contact reactor simultaneously, wherein an initial concentration of ozone is 2 mg/L, and a molar ratio of persulfate to ozone is 1:2, then the water treatment process is complete, wherein a hydraulic retention time of the water subject to treatment in the ozone contact reactor is controlled at 30 min, and the water subject to treatment is kept at a stirring condition during the water treatment process.

According to this preferred embodiment of the present invention, the step of adding persulfate is adding persulfate in solution form.

According to this preferred embodiment of the present invention, the water subject to treatment, which is source water, contains 0.5 mol/L pesticide atrazine. After the water treatment process through oxidation, the removal rate of the removal rate of pesticide atrazine has reached above 99%, which is shown in FIG. 1 of the drawing.

Embodiment 30: According to this preferred embodiment of the present invention, the water treatment process by catalyzing ozone with a persulfate comprises the steps of: introducing ozone into an ozone contact reactor in which the ozone contact reactor is filled with water subject to treatment, which is filtered water, and adding a persulfate, which is a mixture of sodium peroxymonosulfate and potassium peroxydisulfate at any mixing ratio, into the ozone contact reactor simultaneously, wherein an initial concentration of ozone is 0.5 mg/L, and a molar ratio of persulfate to ozone is 1:5, then the water treatment process is complete, wherein a hydraulic retention time of the water subject to treatment in the ozone contact reactor is controlled at 30 min, and the water subject to treatment is kept at a stirring condition during the water treatment process.

According to this preferred embodiment of the present invention, the step of adding persulfate is adding persulfate in solution form.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A water treatment process by catalyzing ozone with a persulfate, characterized in that: the water treatment process by catalyzing ozone with a persulfate comprises the steps of:
   (a) filling water subject to treatment into an ozone contact reactor;
   (b) simultaneously introducing ozone and adding persulfate into an ozone contact reactor such that the ozone has an initial concentration of 0.1~40 mg/L and a molar ratio of persulfate to ozone is 1:0.1~10, wherein a hydraulic retention time of the water subject to treatment in the ozone contact reactor is 5~60min, and the water subject to treatment is kept at a stirring condition during the water treatment process, then the water treatment process is complete, wherein the water subject to treatment is polluted water, secondary effluent from wastewater treatment plant, water from any water source or filtered water.

2. The water treatment process by catalyzing ozone with a persulfate according to claim 1, characterized in that: wherein the persulfate is peroxomonosulfate, peroxodisulfate or a mixture of peroxomonosulfate and peroxodisulfate, wherein the peroxomonosulfate is selected from one or more of the group consisting of potassium peroxymonosulfate, sodium peroxymonosulfate and ammonium peroxymonosulfate, wherein the peroxodisulfate is selected from one or more of the group consisting of potassium peroxydisulfate, sodium peroxydisulfate and ammonium peroxydisulfate.

3. The water treatment process by catalyzing ozone with a persulfate according to claim 1, characterized in that: wherein the initial concentration of ozone is 0.5~30 mg/L.

4. The water treatment process by catalyzing ozone with a persulfate according to claim 1, characterized in that: wherein the molar ratio of persulfate to ozone is 1:0.2~0.9.

5. The water treatment process by catalyzing ozone with a persulfate according to claim 1, characterized in that: wherein the molar ratio of persulfate to ozone is 1:0.8~3.

6. The water treatment process by catalyzing ozone with a persulfate according to claim 1, characterized in that: wherein the molar ratio of persulfate to ozone is 1:1.

7. The water treatment process by catalyzing ozone with a persulfate according to claim 1, characterized in that: wherein the persulfate is a persulfate-alkali complex salt, wherein a molar ratio of persulfate to alkali of the persulfate-alkali complex salt is 1: 1~10, wherein the persulfate of the persulfate-alkali complex salt is peroxomonosulfate, peroxodisulfate or a mixture of peroxomonosulfate and peroxodisulfate, the alkali of the persulfate-alkali complex salt is selected from one or more of the group consisting of potassium hydroxide, sodium hydroxide, calcium hydroxide, sodium carbonate, potassium carbonate, sodium bicarbonate and potassium bicarbonate.

8. The water treatment process by catalyzing ozone with a persulfate according to claim 7, characterized in that: wherein the molar ratio of persulfate to alkali of the persulfate-alkali complex salt is 1:3~8.

9. The water treatment process by catalyzing ozone with a persulfate according to claim 7, characterized in that: wherein the molar ratio of persulfate to alkali of the persulfate-alkali complex salt is 1:5.

10. The water treatment process by catalyzing ozone with a persulfate according to claim 7, characterized in that: wherein the peroxomonosulfate of the persulfate-alkali complex salt is selected from one or more of the group consisting of potassium peroxymonosulfate, sodium peroxymonosulfate and ammonium peroxymonosulfate, wherein the peroxodisulfate of the persulfate-alkali complex salt is selected from one or more of the group consisting of potassium peroxydisulfate, sodium peroxydisulfate and ammonium peroxydisulfate.

11. The water treatment process by catalyzing ozone with a persulfate according to claim 2, characterized in that: wherein the initial concentration of ozone is 0.5~30 mg/L.

12. The water treatment process by catalyzing ozone with a persulfate according to claim 2, characterized in that: wherein the molar ratio of persulfate to ozone is 1:0.2~0.9.

13. The water treatment process by catalyzing ozone with a persulfate according to claim 2, characterized in that: wherein the molar ratio of persulfate to ozone is 1:0.8~3.

14. The water treatment process by catalyzing ozone with a persulfate according to claim 2, characterized in that: wherein the molar ratio of persulfate to ozone is 1:1.

15. The water treatment process by catalyzing ozone with a persulfate according to claim 2, characterized in that: wherein the persulfate is a persulfate-alkali complex salt, wherein a molar ratio of persulfate to alkali of the persulfate-alkali complex salt is 1: 1~10, wherein the persulfate of the persulfate-alkali complex salt is peroxomonosulfate, peroxodisulfate or a mixture of peroxomonosulfate and peroxodisulfate, the alkali of the persulfate-alkali complex salt is selected from one or more of the group consisting of potassium hydroxide, sodium hydroxide, calcium hydroxide, sodium carbonate, potassium carbonate, sodium bicarbonate and potassium bicarbonate.

16. The water treatment process by catalyzing ozone with a persulfate according to claim 15, characterized in that: wherein the molar ratio of persulfate to alkali of the persulfate-alkali complex salt is 1:3~8.

17. The water treatment process by catalyzing ozone with a persulfate according to claim 15, characterized in that: wherein the molar ratio of persulfate to alkali of the persulfate-alkali complex salt is 1:5.

18. The water treatment process by catalyzing ozone with a persulfate according to claim 15, characterized in that: wherein the peroxomonosulfate of the persulfate-alkali complex salt is selected from one or more of the group consisting of potassium peroxymonosulfate, sodium peroxymonosulfate and ammonium peroxymonosulfate, wherein the peroxodisulfate of the persulfate-alkali complex salt is selected from one or more of the group consisting of potassium peroxydisulfate, sodium peroxydisulfate and ammonium peroxydisulfate.

* * * * *